United States Patent [19]
Theard et al.

[11] 3,856,717
[45] Dec. 24, 1974

[54] RIGID POLYETHYLENE FOAM

[75] Inventors: Leslie Peter Theard; Frank Clyde Peterson, both of San Diego; John Lynn Russell, Jr., La Jolla, all of Calif.; Robert L. Reierson, Overland Park, Kans.

[73] Assignee: Gulf Research & Development Company, Pittsburgh, Pa.

[22] Filed: June 25, 1973

[21] Appl. No.: 373,586

Related U.S. Application Data

[63] Continuation of Ser. No. 204,353, Dec. 12, 1971, abandoned.

[52] U.S. Cl. .......... 260/2.5 HA, 260/2.5 E, 264/51, 264/53
[51] Int. Cl. .......................... C08f 47/10, C08j 1/26
[58] Field of Search...... 260/2.5 E, 2.5 HA; 264/51, 264/53

[56] References Cited
UNITED STATES PATENTS

| | | | |
|---|---|---|---|
| 3,026,272 | 3/1962 | Rubens et al. | 260/2.5 E |
| 3,026,273 | 3/1962 | Engles | 260/2.5 E |
| 3,227,784 | 1/1966 | Blodes et al. | 260/2.5 E |
| 3,251,728 | 5/1966 | Humbert et al. | 260/2.5 E |
| 3,474,050 | 10/1969 | Chappelear et al. | 260/2.5 E |
| 3,474,051 | 10/1969 | Chappelear et al. | 260/2.5 E |
| 3,491,032 | 1/1970 | Skochdopole et al. | 260/2.5 E |

Primary Examiner—Morton Foelak

[57] ABSTRACT

Rigid polyethylene foams are prepared by heating a mixture of a linear polyethylene and a hydrocarbon boiling below 30° C. in a closed reaction zone to at least the critical temperature of the hydrocarbon in the absence of stirring, and therafter venting the hydrocarbon at a temperature above or below the melting point of the polyethylene.

4 Claims, No Drawings

RIGID POLYETHYLENE FOAM

This is a continuation of application Ser. No. 204,353, filed Dec. 12, 1971 now abandoned.

BACKGROUND OF THE INVENTION

Polyethylene foams have found a large and expanding utility as insulation, decorative objects, toys, furniture and a variety of other industrial and commercial applications. Conventional processes for forming polyethylene foams comprise the use of blowing agents, gases, and the like, for producing expanded polymeric articles of manufacture. Other processes incorporate foreign materials, such as inorganic solids, plasticizers, and the like, into the polymer composition followed by the process of removing the foreign materials by extraction or washing steps. These techniques produce small voids and such porous objects have utility as insulation or filtering mediums.

Another method for the preparation of polyethylene foams is described in U.S. Pat. No. 3,308,073. The subject patent discloses a process wherein a normally solid polyolefin is blended with a volatile, normally liquid hydrocarbon at a temperature above the softening point of the polymer; the blending operation is carried out until the mixture is completely homogeneous. The resultant mixture is cooled below the solidification point of the polymer, and thereafter the normally liquid hydrocarbon is removed from the polymer, forming a porous article of manufacture.

A deficiency of conventional processes in the foaming of linear polyethylene, and particularly high molecular weight linear polyethylene, is that such processes fail to provide a low density polyethylene foam of substantially uniform cell structure. Moreover, such processes are inadequate in the preparation of high molecular weight linear polyethylene foams of controlled skin thicknesses and cell size.

Accordingly, an object of the invention is to provide an improved process for the preparation of linear polyethylene foams.

Another object of the invention is to provide a process for the preparation of linear polyethylene foams having substantially uniform cell size.

Yet another object of the invention is to provide a process for the preparation of linear polyethylene foams having controlled skin thicknesses and cell size.

Other objects, advantages and features of the invention will be readily apparent to those skilled in the art from the following description and the appended claims.

SUMMARY OF THE INVENTION

Low density rigid polyethylene foam compositions having substantially uniform cell size are prepared by heating a mixture of a linear polyethylene and a hydrocarbon boiling below 30° C. in a closed reaction zone to at least the critical temperature of the hydrocarbon, thereafter rapidly venting the hydrocarbon at a temperature above or below the melting point of the linear polyethylene, and recovering from the reaction zone a rigid polyethylene foam.

DESCRIPTION OF THE INVENTION

Rigid polyethylene foams are prepared from normally solid high molecular weight linear polyethylene polymers. The polyethylene polymers suitable in the practice of the invention are linear polyethylenes having a density ranging from 0.940 to 0.980 gram per cubic centimeter. The preferred polyethylene polymers are those having an average molecular weight greater than about 100,000 (as determined from viscosity). The invention is particularly applicable to linear polyethylene polymers having an average molecular weight greater than about 1,000,000.

The linear polyethylenes applicable in the practice of the invention can be prepared by processes such as described in U.S. Pat. No. 2,825,721 to Hogan and Banks. Linear polyethylene polymers can be prepared by any of the known solution processes as well as the "particle-form" process (polymerization of ethylene conducted in suspension and below the temperature at which any substantial portion of the polyethylene formed is in solution in the suspending medium). The "particle-form" polyethylenes ordinarily have an inherent viscosity ranging from 3 to 10 and a high load melt index (ASTM D-1238-57T - Procedure F) ranging from 0.6 to 20.0.

The rigid polyethylene foam compositions can be prepared from a hydrocarbon or hydrocarbon mixtures which boil at a temperature below 30° C. at atmospheric pressure. Suitable hydrocarbons include saturated and unsaturated acyclic hydrocarbons such as propane, propylene, normal butane, isobutane, butylene, isopentane, normal pentane and pentene-1.

The linear polyethylene is introduced as solid particles into the reaction or foaming zone. The solid linear polyethylene particles can be in the form of fluff or pellets. A preferred method for preparing the rigid polyethylene foams is to pass the polymerization reaction effluent mixture comprising, for example, isobutane, linear polyethylene fluff, and ethylene from a loop polymerization reactor directly to the foaming zone. As an example of a loop reactor polymerization process capable of producing a polymerization zone effluent mixture which could serve as the feed to the foaming zone, reference is made to U.S. Pat. No. 3,451,785, incorporated herein by reference thereto.

In the exercise of this present invention, the hydrocarbon in liquid form and polyethylene are brought together in a closed common vessel and heated to at least the critical temperature of the hydrocarbon. The vessel must be capable of withstanding internal pressures of at least 1,000 psig as normal operating pressures will range from about 200 to 1,000 psig. As the pressure is increased in the foaming vessel, the result is increased skin thickness of the linear polyethylene foam and reduced cell or pore size. Substantially increased skin thickness and reduction in pore size is obtained when operating at pressures in excess of 700 psig. Preferably, the heating step is conducted in an inert atmosphere, that is an atmosphere substantially free of any material other than the hydrocarbon employed in the preparation of rigid linear polyethylene foam.

The weight ratio of the hydrocarbon to linear polyethylene employed in preparing the rigid foam compositions of the invention is at least 1:1 and will normally range from 1:1 to 5:1, although higher hydrocarbon to polymer weight ratios can be employed. As the ratio of hydrocarbon to polymer increases, the bulk density of the product rigid foam decreases and the thickness of the skin of the rigid polyethylene foam composition decreases. Bulk densities of less than 0.5 gram per cubic centimeter are obtained when employing a weight ratio of at least 1:1.

The linear polyethylene and hydrocarbon mixture is maintained at the critical temperature of the hydrocarbon, or at a higher temperature, for a period of time required to obtain a rigid linear polyethylene foam composition having substantially uniform cell structure. Although not to be limited thereto, the residence time in the foaming zone will normally range from about 1 to 90 minutes.

Following formation of the rigid polyethylene foam at or above the critical temperature of the hydrocarbon, the foaming zone is vented at a temperature either above or below the melting point of the linear polyethylene to separate the hydrocarbon from the foam. It is within the scope of the invention to vent or release the hydrocarbon from the foaming zone at the foam temperature or to employ an intermediate cooling step prior to venting or releasing the hydrocarbon. In this second embodiment, the reaction mixture can be cooled to a temperature slightly above the melting point of the linear polyethylene or to a temperature below the melting point of the linear polyethylene and the hydrocarbon released so as to separate the hydrocarbon from the rigid polyethylene foam. In yet another embodiment, partial venting is effected at the foaming temperature or at a slightly lower temperature, followed by cooling and completion of the venting step.

When the hydrocarbon is in liquid form and is vented at a temperature at which its vapor pressure exceeds the pressure of the atmosphere into which it is vented, cooling results from vaporization of the hydrocarbon. When isobutane is the hydrocarbon, for example, vaporization will be very rapid, resulting in rapid cooling. This particular effect is beneficial in molding foam articles as it reduces the mold cycle time by accelerating the cooling of the foam to the point at which it is rigid enough to be removed from the mold without losing its shape.

The density of the foam product composition can be adjusted through control of the venting step. Lower bulk densities can be obtained by at least partially venting the hydrocarbon at the foaming temperature or at a temperature slightly below the foaming temperature.

The rigid polyethylene foam compositions produced by the process of this invention have substantially uniform cell size and normally have bulk densities not greater than 0.40 gram per cubic centimeter and often bulk densities of less than 0.30 gram per cubic centimeter. The skin thicknesses of the rigid polyethylene foam compositions so prepared will generally range from about 0.2 to 3.0 millimeters.

The rigid polyethylene foam compositions of this invention have high flexural yield strengths. Using ASTM D-349-56 as a method for determining flexural yield strengths of the rigid polyethylene foam compositions, stress values in excess of 2,500 pounds per square inch are normally obtained. Thus, the rigid polyethylene foam compositions of this invention are generally adaptable in the fabrication of molded strength members wherein relatively low bulk densities are desired.

The rigid linear polyethylene foams can be employed in the fabrication of furniture and the like. For example, it is readily apparent from the foregoing description that particulate linear polyethylene and a hydrocarbon having a boiling point below 30° C. can be passed to a pressure mold capable of forming an article of manufacture in the desired shape. Operating in this manner would permit the in-place foaming of the linear polyethylene to produce articles of manufacture useful in the fabrication of furniture.

The hydrocarbon employed in producing the rigid polyethylene foams of the invention appears to function as a bonding agent and not as a conventional polymer foam blowing agent. This is evidenced by the fact that foaming can be completed before the vessel is vented, the vessel being cooled to room temperature before venting. Further, foam formation depends on phenomena which occur near the critical temperature of the hydrocarbon bonding agent. It has been observed that the foam cell structure is a function of the partial pressure of the hydrocarbon employed in the process and that the bulk density of the foamed product can be increased or decreased by adjusting the temperature at which the reaction zone is vented and the rate of venting the hydrocarbon.

Substantially uniform cell structure refers to foam compositions wherein at least 90 percent of the pore volumes or cells will each have a pore volume equal to the average pore volume multiplied by a factor in the range of 0.5 to 1.5.

The following examples are presented to illustrate objects and advantages of the invention. However, it is not intended to limit the invention to the specific embodiments described therein.

EXAMPLE I

In this example the preparation of a rigid linear polyethylene foam employing isobutane is described. Twenty grams of linear polyethylene in particle form having a density of 0.95 gram per cubic centimeter were immersed in 40 milliliters of iosbutane placed in a deaerated glass pressure vessel. The foaming vessel employed in this example and Examples II–IV was a 3 ounce Fisher-Porter aerosol vessel. The mixture was heated until the critical temperature of the isobutane (134° C.) was reached, at which time the liquid isobutane turned cloudy and disappeared leaving no detectable liquid vapor interface. The mixture was further heated until a temperature of 138° C. was reached. The pressure vessel was cooled to a temperature below 80° C. and was vented. A rigid polyethylene foam having substantially uniform cell structure and a density of 0.34 gram per cubic centimeter was produced.

EXAMPLE II

In this example the run of Example I was repeated with the exception that the isobutane and linear polyethylene mixture was heated to 140° C. in an oven and permitted to incubate for 4 hours. Upon rapidly venting the isobutane at a temperature below 80° C., a rigid polyethylene foam was produced having a substantially uniform micro-size cell structure encased in a 1 millimeter skin and having a bulk density of 0.416 g/cm³.

EXAMPLE III

In this example the necessity for heating the hydrocarbon to at least the critical temperature of the hydrocarbon is demonstrated. A mixture comprising 20 grams of the linear polyethylene of Example I and 40 grams of normal butane having a critical temperature of 152° C. was heated to 140° C. in an oven and permitted to incubate for 4 hours. The foaming vessel was cooled to room temperature and then vented. The sample produced in the normal butane did not foam.

The run of Paragraph 1 of this example was repeated with the exception that the mixture was heated to a temperature of 165° C. and maintained at this temperature for 4 hours. The product recovered from the foaming vessel comprised a rigid polyethylene foam having substantially uniform cell structure with a 2 millimeter skin thickness and a bulk density of 0.29 g/cm³.

EXAMPLE IV

The run of Example I was repeated with the exception that isopentane having a critical temperature of 188° C. was employed as the liquid hydrocarbon and two samples of the mixture were heated to 165° C. and 205° C., respectively. For the sample heated to 205° C. a rigid polyethylene foam was produced having a substantially uniform cell structure and a bulk density of 0.326 g/cm³. For the sample heated to 165° C., no foam was produced.

EXAMPLE V

In this example two runs (Runs V-A and V-B) were made in which a mixture of linear polyethylene fluff (Run V-A polyethylene had a melt index of 0.093, a melting point in air of 138° C., and a bulk density of 0.417 g/cm³ — Run V-B polyethylene had a density of 0.962 and a bulk density of 0.566 g/cm³) and isobutane was heated in a reaction vessel comprising a ¾ inch outside diameter by 8 inches long stainless steel tube which was placed in an oil bath. The weight of the polyethylene sample, volume of solvent, bath temperature, pressure in the foaming vessel, and time of immersion in the oil bath were as shown below in Table I:

Table I

| Run | Polyethylene Weight in Grams | Isobutane Volume, ml | Immersion Period, Minutes | Oil Bath Temp., °C. | Maximum Pressure, lbs/in² gauge |
|---|---|---|---|---|---|
| V-A | 10.0 | 30 | 60 | 153 | 600 |
| V-B | 5.0 | 28 | 135 | 151 | 590 |

The foaming vessel was then removed from the oil bath, cooled in air for 20 minutes and vented.

Rigid polyethylene foams were recovered in each run having substantially uniform cell structure with the bulk density of the foam produced in Run V-A being 0.377 g/cm³ and the bulk density for the foam produced in Run V-B being 0.398 g/cm³. The thickness of the skin for the rigid polyethylene foam structure was 1.7 and 0.5 millimeter, respectively.

EXAMPLE VI

A rigid polyethylene foam was prepared in this example from the linear polyethylene fluff of Run V-B of Example V using isobutane as the hydrocarbon and the reaction vessel of Example V. Two runs were made (Runs VI-A and VI-B) with the run conditions as set forth below in Table II. After heating the isobutane and linear polyethylene mixture to the temperature indicated below in Table II and maintaining the reaction mixture at this temperature for the indicated reaction times, the reaction vessel was vented as described above in Example V.

Table II

| Run No. | Linear Polyethylene Weight, Grams | Volume of Isobutane | Isobutane to Polymer Ratio (ml/g) | Reaction Time, Minutes | Bath Temp., °C. | Pressure Range (psig) |
|---|---|---|---|---|---|---|
| VI-A | 8.5 | 38.5 | 4.5 | 45 | 151 | 560-570 |
| VI-B | 12.0 | 36.5 | 3.4 | 90 | 151 | 530-560 |

A rigid polyethylene foam was recovered in Run VI-A having a skin thickness of 1.6 mm and a bulk density of 0.42 g/cm³. The rigid polyethylene foam recovered in Run VI-B had a skin thickness of about 3.0 mm and a bulk density of 0.52 g/cm³. The significant difference in the process conditions employed in Runs VI-A and VI-B was the increase in the quantity of isobutane employed. It is apparent from the above that the bulk density of the rigid polyethylene foam can be substantially reduced by increasing the isobutane to polymer ratio in the foaming vessel.

EXAMPLE VII

The relationship of the pressure in the foaming vessel to the bulk density and skin thickness of the rigid polyethylene foam produced is illustrated in this example. The procedure of Example VI was repeated for Runs VII-A, VII-B and VII-C with specific process parameters as set forth below in Table III. The foaming vessel in each run was vented in the manner described above in connection with Example V. The bulk density of the rigid polyethylene foam products produced and the skin thicknesses of the rigid polyethylene foams are also presented in Table III.

Table III

| Linear Polyethylene Weight, Grams | Isobutane Volume, ml | Isobutane to Polymer Ratio (ml/g) | Reaction Time, Minutes | Bath Temp., °C. | Pressure Range (psig) | Skin Thickness (mm) | Bulk Density (g/cm³) |
|---|---|---|---|---|---|---|---|
| 8.0 | 36.0 | 4.5 | 41 | 151 | 470-505 | 0.2 | 0.35 |
| 8.0 | 36.0 | 4.5 | 45 | 151 | 530-550 | 0.3 | 0.40 |
| 10.0 | 45.0 | 4.5 | 38 | 151 | 595-605 | 1.6-3.5 | 0.43 |

A comparison of the results obtained in the three runs of this example demonstrates that with increased pressure, increased skin thickness and increased bulk density of the polyethylene foam product are obtained.

EXAMPLE VIII

In this example the effect of at least partially venting the foaming vessel at the foaming temperature is demonstrated. A rigid polyethylene foam was produced by the process of Example VII employing the linear polyethylene fluff of Example VII and isobutane as the hydrocarbon solvent bonding agent. The process conditions employed for Runs VIII-A and VIII-B are as set forth below in Table IV. In addition to the process conditions, the skin thickness and bulk density of the rigid polyethylene foams are also shown in Table IV.

In Run VIII-A the foaming vessel was vented after removal of the foaming vessel from the bath and after cooling at ambient temperature for a period of 20 minutes. In Run VIII-B the foaming vessel was vented from 590 psig to 540 psig prior to removal of the foaming vessel from the oil bath. The foaming vessel of Run VIII-B was permitted to cool at ambient temperature after removal from the oil bath for a period of 20 minutes and venting of the foaming vessel was then completed.

Table IV

| Run | Linear Polyethylene Sample Weight, Grams | Solvent Volume, ml | Reaction Time, Minutes | Bath Temp., °C. | Pressure, psig | Skin Thickness, mm | Bulk Density of Foam, g/cm³ |
|---|---|---|---|---|---|---|---|
| VIII-A | 15.0 | 60.0 | 48 | 151 | 575 | 2.2 | 0.43 |
| VIII-B | 15.0 | 60.0 | 50 | 151 | 590 | 2.5 | 0.33 |

A comparison of the properties of the rigid polyethylene foam products produced in Runs VIII-A and VIII-B illustrates that by at least partially venting the vessel at the higher temperature, foam products having lower bulk densities and higher skin thicknesses are obtained. In each of Runs VIII-A and VIII-B, rigid polyethylene foam compositions having substantially uniform cell structure were obtained.

Although the invention has been described with reference to specific materials, embodiments and details, various modifications and changes, within the scope of the invention, will be apparent to those skilled in the art and are contemplated to be embraced in the invention.

What is claimed is:

1. A process for preparing a rigid foam of polyethylene which consists essentially of the sequential steps of:
    1. charging a pressure resistant vessel with particulate linear polyethylene having a density in the range of from 0.940 to 0.980 gram per cubic centimeter and having an average molecular weight greater than 100,000 (as determined by viscosity) and (b) a hydrocarbon containing 3-5 carbon atoms and having a boiling point below 30°C. at atmospheric pressure, the weight ratio of charged hydrocarbon to polyethylene being in the range of 1:1 to 5:1,
    2. sealing the vessel from Step (1),
    3. heating the sealed vessel from Step (2) to at least the critical temperature of the hydrocarbon contained in the sealed vessel and maintaining the sealed vessel at such temperature for 1 to 90 minutes,
    4. cooling the contents of the sealed vessel to a temperature sufficiently below the melting point of the linear polyethylene charged in Step (1) so that the linear polyethylene solidifies in the sealed vessel,
    5. opening the sealed vessel to vent the hydrocarbon therefrom, and
    6. recovering a foamed polyethylene resin having a bulk density of less than 0.5 gram per cubic centimeter and a substantially uniform cell structure wherein at least 90% of the pore volumes or cells will each have a pore volume equal to the average pore volume multiplied by a factor in the range of 0.5 to 1.5.

2. The process of claim 1 wherein the linear polyethylene introduced into the foaming zone has an average molecular weight greater than about 1,000,000.

3. The process of claim 1 wherein said hydrocarbon is selected from the group consisting of isobutane, isopentane and normal butane.

4. The process of claim 1 wherein the materials charged to Step (1) consists of the effluent mixture from a polyethylene reactor consisting essentially of polyethylene having a density in the range of from 0.940 to 0.980 gram per cubic centimeter and having an average molecular weight greater than 100,000 (as determined by viscosity), a hydrocarbon containing 3-5 carbon atoms and having a boiling point below 30°C. at atmospheric pressure, the weight ratio of said hydrocarbon to polyethylene being in the range of 1:1 to 5:1, and unpolymerized ethylene.

* * * * *